United States Patent Office 3,563,982
Patented Feb. 16, 1971

3,563,982
INSECT CONTROL PROCESS WITH
SYNTHETIC HORMONES
William S. Bowers, Bowie, Md., assignor to the United
States of America as represented by the Secretary of
Agriculture
No Drawing. Filed Jan. 2, 1969, Ser. No. 788,651
Int. Cl. C07d 17/00, 21/00
U.S. Cl. 260—240                                    32 Claims

ABSTRACT OF THE DISCLOSURE

Methylenedioxybenzyloxy and methylenedioxyphenoxy ethers of straight chain terpenoid compounds and their epoxides were synthesized and found to mimic the juvenile hormones of insects and be extremely effective as insect control agents.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to insect control and more particularly to compounds and to the preparation of compounds that have high juvenile and gonadotropic hormone activity and that are effective in breaking diapause in insects.

Diapause is a condition of physiological arrest during which there is little or no activity, feeding, mating or egg laying. Diapause is utilized by insects as a defense mechanism to allow them to survive winter, summer, drought, and other periods of extreme environmental stress. If diapause is prevented or broken artificially the insect is unable to survive.

It has been shown that diapause can be broken in several adult insects by treatment with the 10, 11 epoxide of methyl farnesenate, the preparation of which is described in patent application Ser. No. 597,484, filed Nov. 28, 1966. However, the new compounds of the present invention are much more effective at breaking diapause since they are 10 to 100 times more active than the esters of 10, 11 epoxy farnesenic acid and are therefore of tremendous economic importance.

There is considerable concern throughout the world about the persistence of many insecticides and insecticide residues in our environment and the potential hazard that these materials represent to human populations. In addition, many species of insect pests have become resistant or immune to many of the insecticides on the market. Thus, more selective chemicals are required which will not pose a threat to human populations and to which the insects will not be able to develop resistance.

The compounds of the present invention should be suitable replacements for the insecticides now being used to control stored product insects and many social pests such as fireants and termites. In addition, it may be feasible to use these compounds in field applications to control a wide variety of insects, the toxicity of the compounds to vertebrates should be insignificant and the cost to produce them commercially should be very competitive with that of well known insecticides.

One object of this invention is to provide a means for achieving selective, safe, economical control of insect pests.

Another object is to provide chemical compounds that prevent insect maturation when applied topically, injected into, or fed to insects in an immature stage of growth.

A further object of this invention is to provide compounds that adversely affect the biological function of insects, particularly their ability to mature to an adult stage.

A still further object of the present invention is to provide chemical compounds that will break diapause when applied topically to diapausing adult insects.

In general, according to the present invention the methylenedioxybenzyloxy and methylenedioxyphenoxy ethers of short chain terpenoid derivatives and their corresponding epoxides are synthesized and found to prevent insect maturation when applied topically, injected into or fed to immature stages of several species of insects and to break diapause when applied topically to diapausing adults. Also, when used as a vapor or as a dip for eggs the compounds show considerable potential as fumigants and ovacides.

When an immature insect, that is one in the larval, pupal or nymphal stage, is treated with these chemicals by contact (topical) or by injection, it is unable to metamorphose into a normal adult. Topical application of as little as 0.1 nanogram (0.0001 microgram) of the more active compounds in this series is sufficient to prevent metamorphosis. The insect which emerges from the treated pupa retains immature genitalia which precludes normal copulation and reproduction. These insects die shortly after molting to this adultoid condition.

The compounds of this invention have the following general formula:

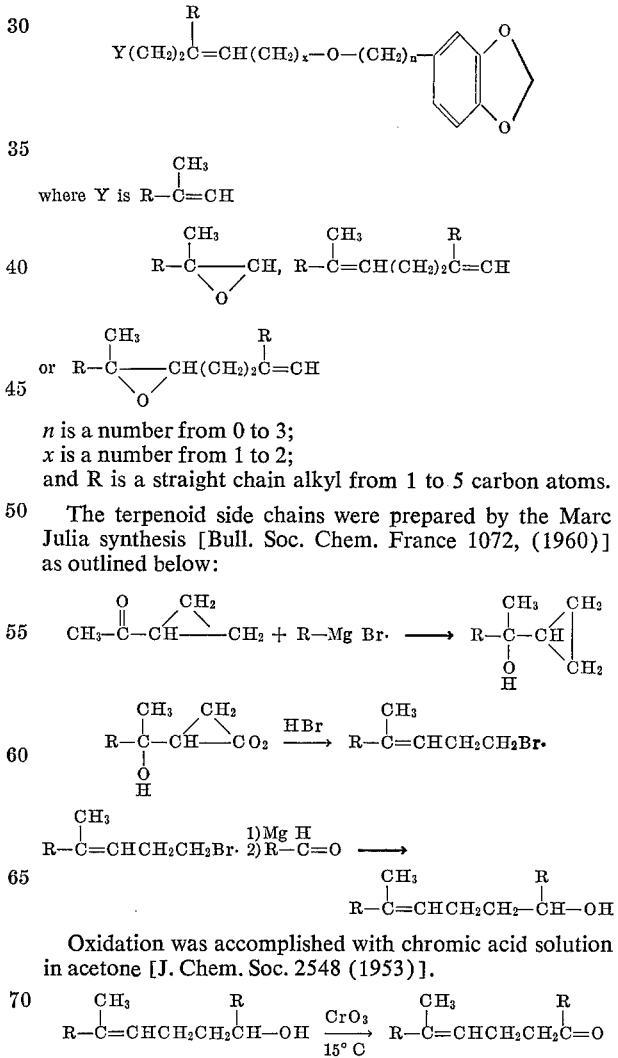

where Y is $R-\underset{\underset{CH_3}{|}}{C}=CH$ $$R-\underset{\underset{CH_3}{|}}{\overset{}{C}}\underset{\diagdown O\diagup}{\underline{\quad\quad}}CH,\ R-\underset{\underset{CH_3}{|}}{\overset{}{C}}=CH(CH_2)_2\underset{\underset{R}{|}}{\overset{}{C}}=CH$$

or $R-\underset{\underset{CH_3}{|}}{\overset{}{C}}\underset{\diagdown O\diagup}{\underline{\quad\quad}}CH(CH_2)_2\underset{\underset{R}{|}}{\overset{}{C}}=CH$ $n$ is a number from 0 to 3;
$x$ is a number from 1 to 2;
and R is a straight chain alkyl from 1 to 5 carbon atoms.

The terpenoid side chains were prepared by the Marc Julia synthesis [Bull. Soc. Chem. France 1072, (1960)] as outlined below:

$$CH_3-\underset{\underset{}{\overset{O}{\|}}}{C}-\overset{\diagup CH_2}{\underset{\diagdown}{CH}}\underline{\quad}CH_2 + R-Mg\ Br \cdot \longrightarrow R-\underset{\underset{\underset{H}{|}}{\overset{}{O}}}{\overset{\underset{}{CH_3}}{\overset{|}{C}}}-\overset{\diagup CH_2}{\underset{\diagdown CH_2}{CH}}$$

$$R-\underset{\underset{\underset{H}{|}}{\overset{}{O}}}{\overset{\underset{}{CH_3}}{\overset{|}{C}}}-\overset{\diagup CH_2}{\underset{}{CH}}\underline{\quad}CO_2 \xrightarrow{HBr} R-\underset{\underset{}{CH_3}}{\overset{|}{C}}=CHCH_2CH_2Br \cdot$$

$$R-\underset{\underset{}{CH_3}}{\overset{|}{C}}=CHCH_2CH_2Br \cdot \xrightarrow[2)R-C=O]{1)Mg\ H} \longrightarrow$$

$$R-\underset{\underset{}{CH_3}}{\overset{|}{C}}=CHCH_2CH_2-\underset{\underset{}{R}}{\overset{|}{CH}}-OH$$

Oxidation was accomplished with chromic acid solution in acetone [J. Chem. Soc. 2548 (1953)].

$$R-\underset{\underset{}{CH_3}}{\overset{|}{C}}=CHCH_2CH_2\underset{\underset{}{R}}{\overset{|}{CH}}-OH \xrightarrow[15°\ C]{CrO_3} R-\underset{\underset{}{CH_3}}{\overset{|}{C}}=CHCH_2CH_2\underset{\underset{}{R}}{\overset{|}{C}}=O$$

The corresponding vinyl analogs are prepared by the grignard reaction with vinyl magnesium bromide (or chloride) in tetrahydrofuran.

$$R-\underset{\underset{CH_3}{|}}{C}=CHCH_2CH_2\underset{\underset{R}{|}}{C}=O + CH_2=CHMgBr. \longrightarrow$$

$$R-\underset{\underset{CH_3}{|}}{C}=CHCH_2CH_2\underset{\underset{R}{|}}{C}-CH=CH_2$$
$$\underset{\underset{H}{|}}{O}$$

The vinyl analogs were converted to the bromides by treatment with hydrogen bromide in acetic acid. Thus, an aliquot of the vinyl analog was stirred in an ice bath at 5° C. in an organic solvent such as hexane, benzene, diethyl ether or dichloromethane during the dropwise addition of two molar equivalents of hydrogen bromide as a 30% solution in acetic acid. After the addition of HBr the reaction mixture was poured into an excess of ice cold 5% sodium carbonate, extracted with diethyl ether and washed to neutrality with water. After drying the ethereal extracts over sodium sulfate and removal of the solvent in vacuo the bromide was obtained in nearly quantitative yield.

$$R-\underset{\underset{CH_3}{|}}{C}=CHCH_2CH_2\underset{\underset{R}{|}}{C}-CH=CH_2 \xrightarrow{HBr}$$
$$\underset{\underset{H}{|}}{O}$$

$$R-\underset{\underset{CH_3}{|}}{C}=CHCH_2CH_2\underset{\underset{R}{|}}{C}=CHCH_2Br.$$

The bromides were refluxed for 3–5 hrs. with a slight molar excess of sesamol and potassium hydroxide in a 1–1 mixture of 95% ethanol and dimethoxyethane to yield the sesamolyl ethers.

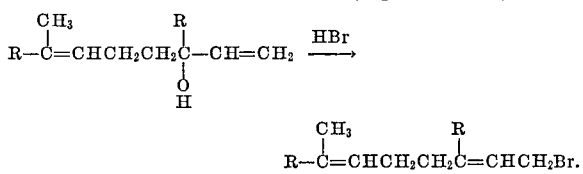

The bromides were refluxed with a slight molar excess of potassium tert-butoxide and piperonyl alcohol in dimethoxyethane for 3–5 hours to yield the piperonly ethers.

except that the bromides were prepared as follows by a continuation of the Marc Julia synthesis:

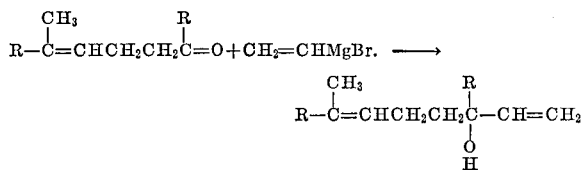

The sesamolyl and piperonyl ethers prepared from the bromides had the following several formulas:

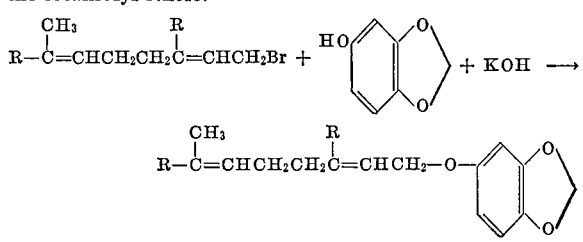

and in which R is a straight chain alkyl from 1 to 5 carbon atoms such as $CH_3$—, $CH_3CH_2$—, and $CH_3CH_2CH_2$—, etc.

The sesamolyl and piperonyl ethers were epoxidized by stirring them in an organic solvent such as hexane, benzene or methylene chloride during the addition of a slight molar excess of an epoxidizing agent such as m-chloro perbenzoic acid. Epoxidation occurred selectively at the terminal double bond within a few minutes to 3 or 4 hours. The reaction mixture was washed with 5% sodium carbonate and then with water to neutrality, dried over sodium sulfate and the solvent removed in vacuo. The epoxides were purified by chromatography over florisil.

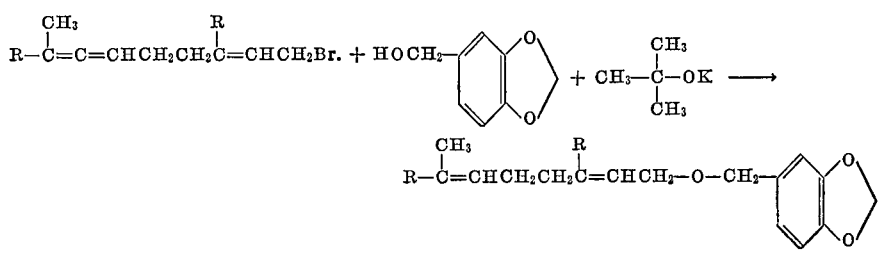

In all of the reactions above, from the preparation of the terpenoid side chains to the preparation of the sesamolyl and piperonyl ethers, R is a straight chain alkyl from 1 to 5 carbon atoms such as $CH_3$—, $CH_3CH_2$, $CH_3CH_2CH_2$— etc.

The sesamolyl and piperonyl ethers were purified by chromatography over florisil.

Purity was determined by gas-liquid chromatography and a combination of nuclear magnetic resonance and ultra-violet, infradred and mass spectroscopy to be 99+%.

Another series of compounds in which the carbon chain was one carbon longer was prepared in a similar manner Purity was ascertained by gas-liquid chromatography and a combination of nuclear magnetic resonance and ultra-violet, infrared and mass spectroscopy to be 99+%.

The sesquiterpenoid side chains of the general formula $$R-\underset{\underset{CH_3}{|}}{C}=CHCH_2CH_2\underset{\underset{R}{|}}{C}=CHCH_2CH_2\underset{\underset{R}{|}}{C}=CHCH_2-$$

in which R is a straight chain alkyl from 1 to 5 carbon atoms such as $CH_3$—, $CH_3CH_2$—, $CH_3CH_2CH_2$— etc. were prepared from the bromides via the acetoacetic ester synthesis.

Thus:

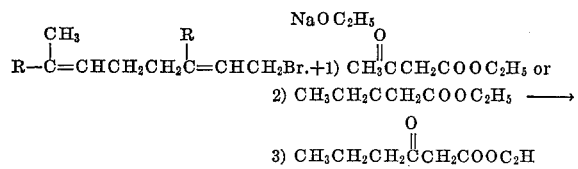

Corresponding keto esters

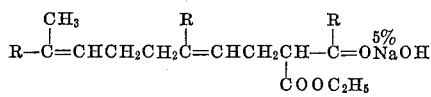

which after reflux with 5% aqueous sodium hydroxide (1–2 hours) yields the decarboxylated ketone.

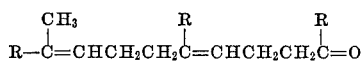

Reaction of these ketones with vinyl magnesium bromide (or chloride in tetrahydrofuran followed by synthesis of the bromide with hydrogen bromide gave bromides of the following general formula:

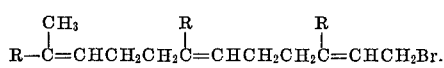

The sesamolyl and piperonyl ethers and their epoxides were then prepared as outlined previously for the terpenoid compounds.

Some of the sesamolyl and piperonyl ethers and their epoxides that have been synthesized by the described procedures are listed in Table I.

The morphogenetic effects of some of the compounds in the Tenebrio genitalia assay (Life Sciences 4, 2323–31, 1965) are shown in Table II. In general, the sesamolyl derivatives were ten times more active than the piperonyl derivatives.

Topical application of 0.01 to 0.1 μg. of compound 3, Table I to pupae of Coleoptera such as Tenebrio molitor (yellow mealworm) and Tribolium confusum (confused flour beetle) results in the formation of pupal-adult intermediates. Topical application of 0.001 to 0.1 μg. of compounds 7 and 15 produce the same effects. Less dramatic effects such as pupal genitalia are obtained with smaller amounts of these compounds.

Topical application of 1.0 μg. of compound 3 and 0.1 μg. of compounds 7 and 15 to nymphs of Hemiptera such as Oncopeltus fasciatus (milkweed bug) and Pyrrhocoris apterus (red linden bug) caused them to molt to nymphal-adult intermediates with nymphal genitalia and other immature characteristics which prevented them from copulating and reproducing and caused them to die shortly thereafter.

Topical treatment of Diptera prepupae and pupae such as Musca domestica (housefly) with 0.5 to 1.0 μg. of compound 3 caused development of pupal-adult intermediates which died within the puparium.

Adult emergence of another Diptera, Aedes aegypti (yellow fever mosquito) was completely inhibited by exposure of 4th instar mosquito larvae to 0.1 parts per million of compound 3 in water. Pupation of this insect was completely inhibited by exposure of the larvae to 1.0 to 10.0 parts per million of compound 3.

Topical application of 10 to 100 μg. of compounds 3, 7 and 15 to larvae of Lepidoptera such as Manduca sexta (tobacco hornworm) caused prolongation of molting cycle and feeding period, extra larval molts, failure to pupate and death. Feeding the larvae the same compounds at a dosage level of 0.01 to 125.0 parts per million caused the same effects. Similar results were obtained when larvae of Heliothis zea (corn earworm) were treated with these compounds. When pupae of Manduca sexta were treated topically or injected with 1.0 to 5.0 μg. of the compounds of this invention they molted to pupal-adult intermediates or second pupae which were unable to reproduce and died shortly thereafter.

Although the vapor pressures of the compounds of this invention are not very high, the compounds are so active that when Tenebrio molitor and Tribolium confusum pupae were confined in pint jars containing as little as 100 μg. of compounds 3, 7 and 15 per jar they molted to second pupae and pupal-adult intermediates and died shortly thereafter. The pupae were suspended in the jar in such a manner that they did not contact the compounds directly but were simply exposed to the vapor. These results exemplify the potential use of the compounds of this invention as fumigants.

When eggs of the Epilachna varivestis (Mexican bean beetle) were dipped into a solution containing 10 parts per million of compound 3, they failed to undergo embryogenesis and none of the eggs hatched. This exemplifies the potential use of these compounds as ovacides.

Incorporating these compounds in the diets of insects affected the insects in several ways depending on the dosage. The diet studies were confined mostly to Tribolium confusum because it has a short larval cycle and can be handled with ease. Tribolium larvae fed a diet containing 0.1 to 10.0 parts per million of compounds 3, 7 and 15 underwent supernumerary molting to larger and larger larvae until they became two to two and one-half times normal size. The larval life cycle was extended from the normal 20 days to 85 or more days, food consumption was increased two to three times and the larvae eventually died without developing to the adult stage.

Although feeding may not appear to be useful in controlling insects in that the larval feeding stage is prolonged and food consumption is increased, feeding the compounds of this invention in those cases where the primary source of infestation must be stopped to prevent further damage could effectively eliminate the primary infestation and thus be an important means of control.

When these compounds were fed in much lower concentrations than those described above the pupal-adult molts were disrupted and the insects were prevented from developing to normal adults without lengthening substantially the larval life or increasing the feed consumption.

TABLE I

Synthesized sesamolyl and piperonyl ethers and their epoxides (1) 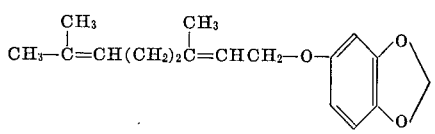

(2) 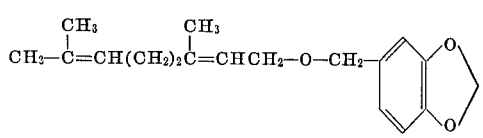

(3) 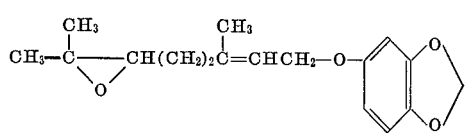

(4) 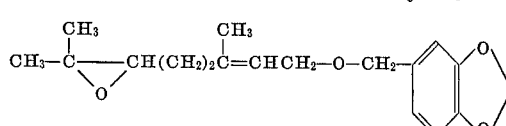

(5) 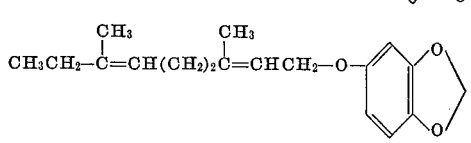

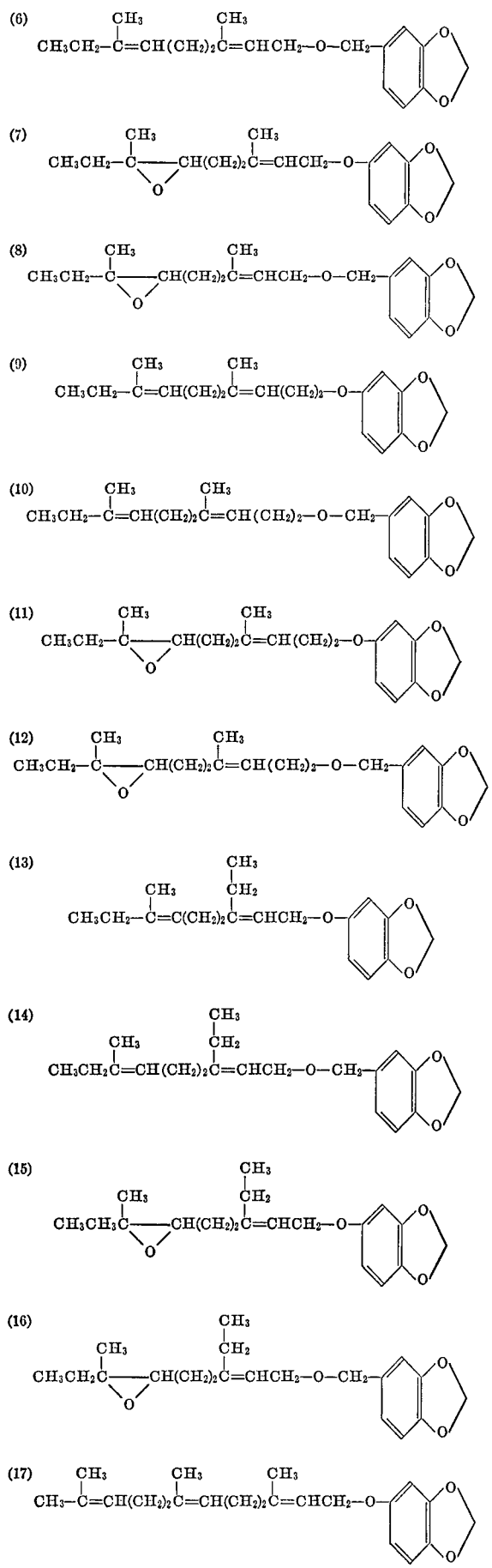
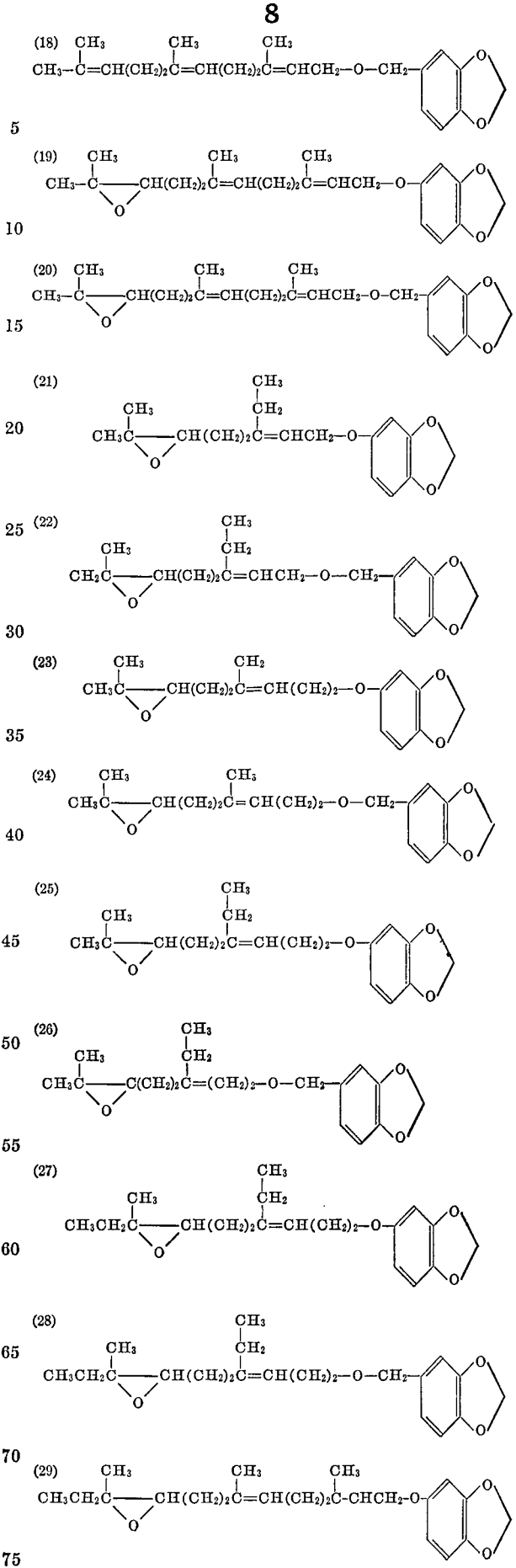

(30) 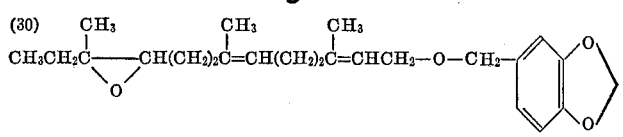

(31) 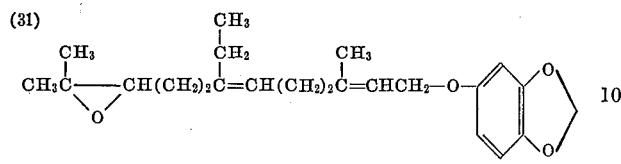

(32) 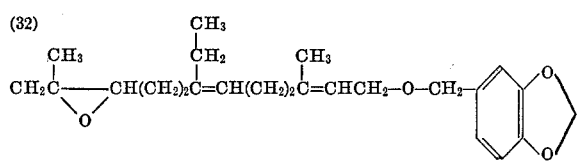

(33) 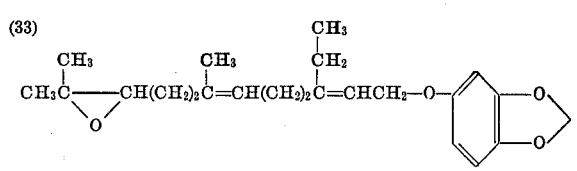

(34) 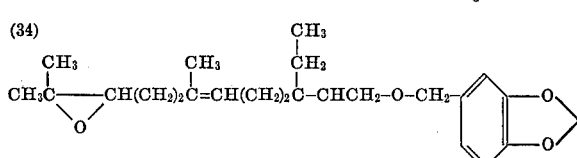

(35) 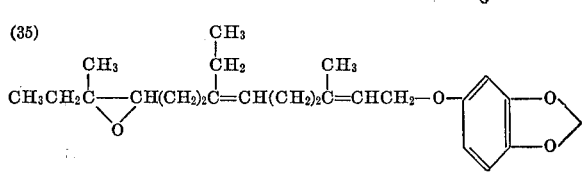

(36) 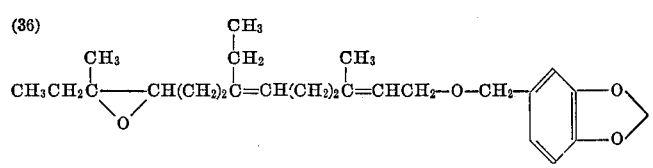

(37) 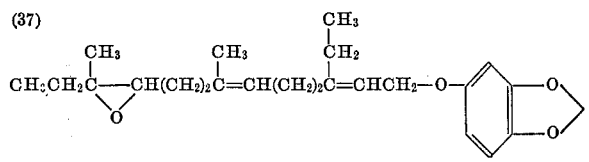

(38) 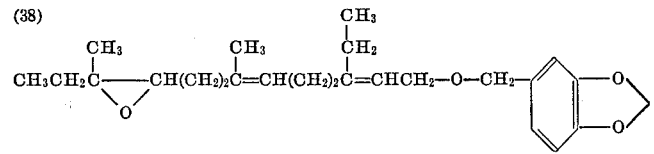

(39) 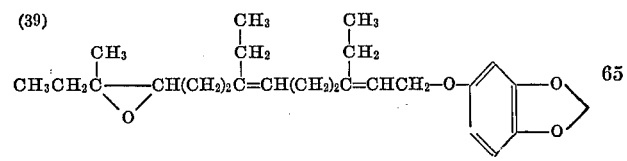

(40) 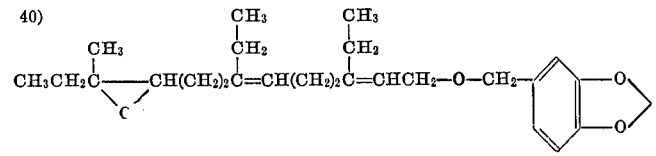

TABLE II
[Morphogenetic effects of representative compounds in the *Tenebrio* genitalia assay]

| | Micrograms of compound required to produce the indicated morphogenetic effects | |
|---|---|---|
| | Pupal adult intermediates [1] | Pupal genitalia [2] |
| Compound Number in Table I: | | |
| 1 | 1.0 | 0.1 |
| 2 | 10.0 | 1.0 |
| 3 | 0.1 | 0.01 |
| 5 | 0.01 | 0.005 |
| 7 | 0.001 | 0.0005 |
| 9 | 0.01 | 0.005 |
| 11 | 0.001 | 0.0005 |
| 13 | 0.01 | 0.005 |
| 15 | 0.001 | 0.0005 |
| 17 | 10.0 | 1.0 |
| 18 | 100.0 | 10.0 |
| 19 | 1.0 | 0.1 |
| 20 | 10.0 | 1.0 |

[1] Pupal adult intermediates represent an intermediate in which the insect molts to a monster with an essentially pupal abdomen and adultoid head and thorax.

[2] Pupal genitalia refers to the effect in which the insect is nearly adult but with immature genitalia.

NOTE.—Each of the above morphogenetic effects causes the insect to die shortly thereafter.

I claim:

1. A novel compound possessing insect control properties, said properties being exhibited by the prevention of maturation and the breaking of diapause in insects and said compound having the general formula

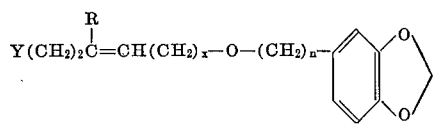

wherein Y is selected from the group consisting of

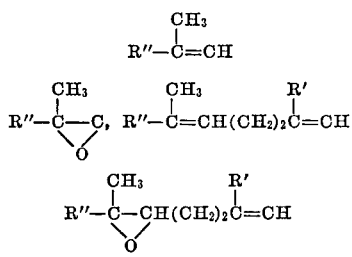

$n$ is a number from 0 to 3;
$x$ is a number from 1 to 2;
and R, R' and R" are straight chain alkyls from 1 to 5 carbon atoms.

2. The compound of claim 1 in which Y is

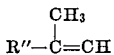

3. The compound of claim 2 in which R and R" are methyl.
4. The compound of claim 3 in which $x$ is 1.
5. The compound of claim 3 in which $n$ is 0.
6. The compound of claim 3 in which $n$ is 1.
7. The compound of claim 2 in which R is methyl, R" is ethyl and $x$ is 1.
8. The compound of claim 2 in which R is methyl, R" is ethyl and $x$ is 2.
9. The compound of claim 2 in which R and R" are ethyl and $x$ is 1.
10. The compound of claim 1 in which Y is

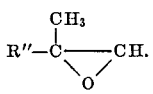

11. The compound of claim 10 in which R is methyl, R" is ethyl and $x$ is 2.
12. The compound of claim 10 in which R is ethyl, R" is methyl and $x$ is 1.
13. The compound of claim 10 in which R and R" are methyl and $x$ is 2.
14. The compound of claim 10 in which R is ethyl, R" is methyl and $x$ is 2.
15. The compound of claim 10 in which R and R" are ethyl and $x$ is 2.

16. The compound of claim 1 in which Y is

17. The compound of claim 16 in which R, R' and R" are methyl.
18. The compound of claim 17 in which $x$ is 1.
19. The compound of claim 17 in which $n$ is 0.
20. The compound of claim 17 in which $n$ is 1.
21. The compound of claim 1 in which Y is

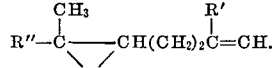

22. The compound of claim 21 in which R, R' and R" are methyl.
23. The compound of claim 22 in which $x$ is 1.
24. The compound of claim 22 in which $n$ is 0.
25. The compound of claim 22 in which $n$ is 1.
26. The compound of claim 21 in which R and R' are methyl and R" is ethyl and $x$ is 1.
27. The compound of claim 21 in which R and R" are methyl, R' is ethyl and $x$ is 1.
28. The compound of claim 21 in which R is methyl, R' and R" are ethyl and $x$ is 1.
29. The compound of claim 21 in which R, R' and R" are ethyl and $x$ is 1.
30. 3',4' - methylenedioxyphenoxy - 6,7-epoxy,3,7-dimethyl-2-octene.
31. 3',4' - methylenedioxyphenoxy - 6,7-epoxy, 3,7-dimethyl-2-nonene.
32. 3',4'-methylenedioxyphenoxy - 6,7 - epoxy, 3-ethyl, 7-methyl-2-nonene.

References Cited

UNITED STATES PATENTS

| | | | |
|---|---|---|---|
| 3,453,362 | 7/1969 | Cruickshank | 260—240 |
| 3,513,176 | 5/1970 | Andrews et al. | 260—348 |

OTHER REFERENCES

Index Chemicus, vol. 33, No. 13, No. 114522 (June 30, 1969).

JOHN D. RANDOLPH, Primary Examiner

U.S. Cl. X.R.

260—340.5; 603, 638, 654; 424—282